United States Patent [19]
Herdzina et al.

[11] 3,875,790
[45] Apr. 8, 1975

[54] METHOD AND APPARATUS FOR TESTING END CLOSURES

[75] Inventors: Frank John Herdzina, Schaumburg; Edward Charles Jacobs, Wauconda; Richard Paul Nightingale, Fox River Grove, all of Ill.

[73] Assignee: American Can Company, Greenwich, Conn.

[22] Filed: Mar. 26, 1974

[21] Appl. No.: 454,837

[52] U.S. Cl............................ 73/40; 73/45.2
[51] Int. Cl............................ G01m 3/04
[58] Field of Search ......... 73/37, 40, 41, 45.1, 45.2, 73/45.3, 45.4, 46, 49.2, 49.3, 49.8; 220/24 A, 51

[56] References Cited
UNITED STATES PATENTS

| | | | |
|---|---|---|---|
| 2,696,107 | 12/1954 | Blang-Leisk | 73/45.2 X |
| 3,499,314 | 3/1970 | Roberts et al. | 73/45.2 |

Primary Examiner—Richard C. Queisser
Assistant Examiner—John S. Appleman
Attorney, Agent, or Firm—Robert P. Auber; Paul R. Audet; George P. Ziehmer

[57] ABSTRACT

Improved method and apparatus for testing for leakage with a pressurized gas media, a container end closure having a displaceable member sealed to the end closure by a distensible sealant material, the improved method comprising effecting a separation between the end closure and displaceable member to distend the sealant material and to expose the sealant material to the pressurized gas, to test the sealant material and the seal it provides for leakage. In the improved apparatus, means for effecting the separation are provided in a test chamber, the lower chambered member thereof including a solid center chuck and a vertically reciprocable spring-mounted pilot ring peripheral to the chuck, and the vertically moveable upper chambered member thereof including an engaging surface for engaging and moving an end closure seated on the pilot ring downward while downward movement of the displaceable member is resisted by the center chuck.

16 Claims, 7 Drawing Figures

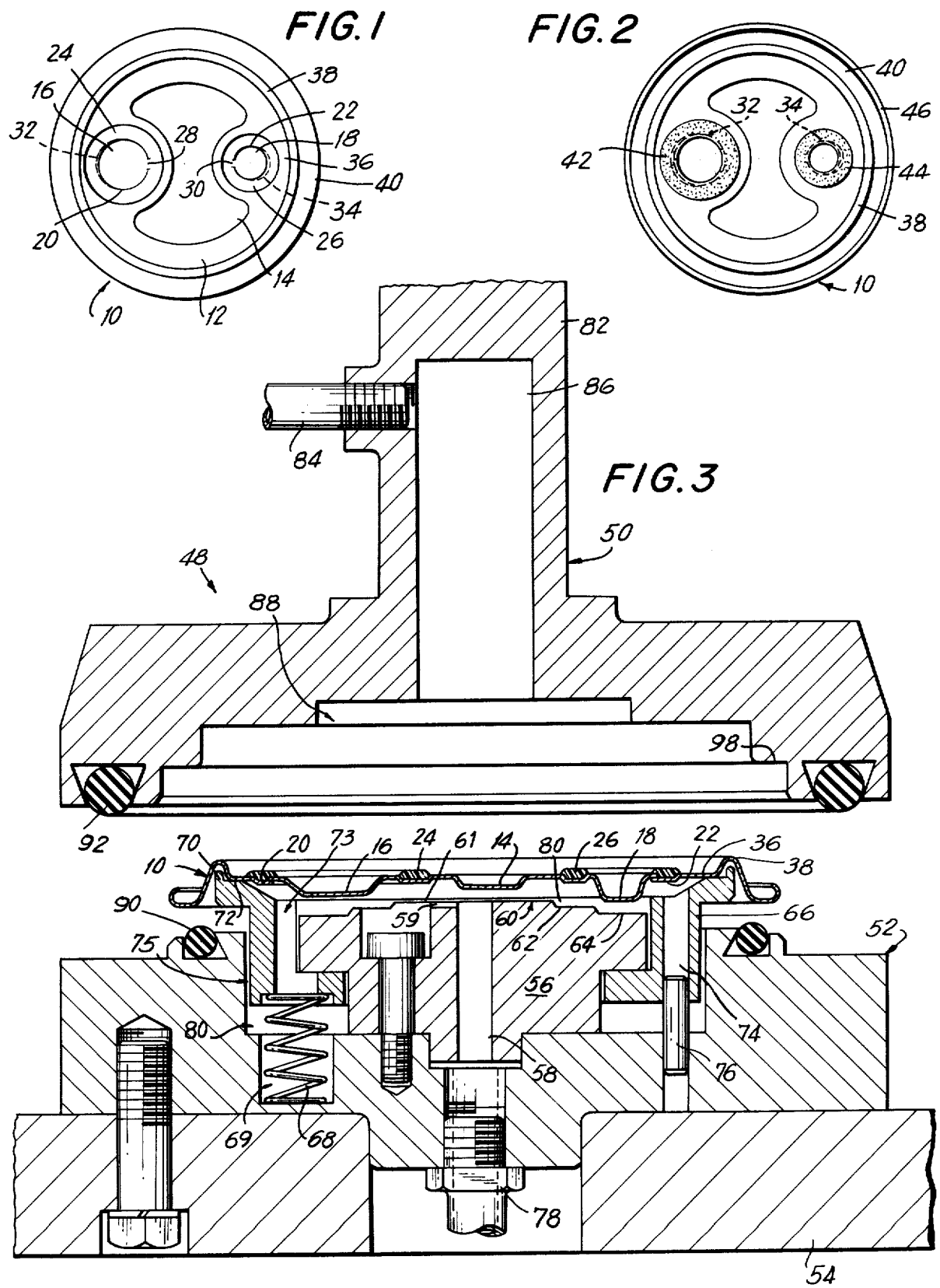

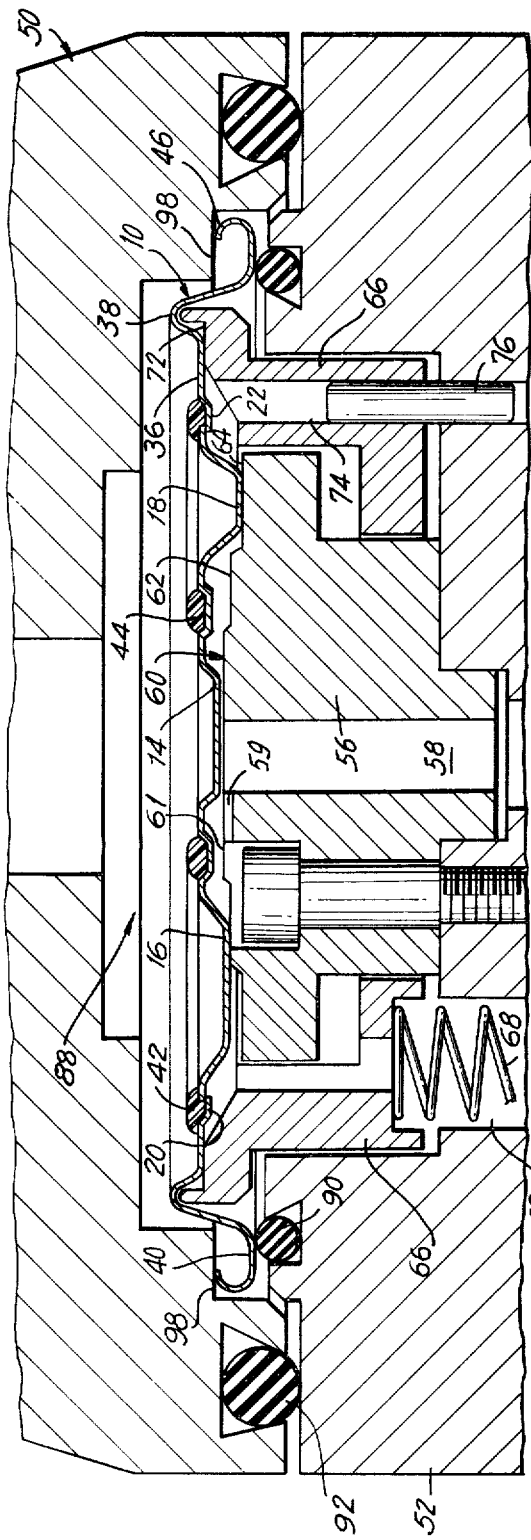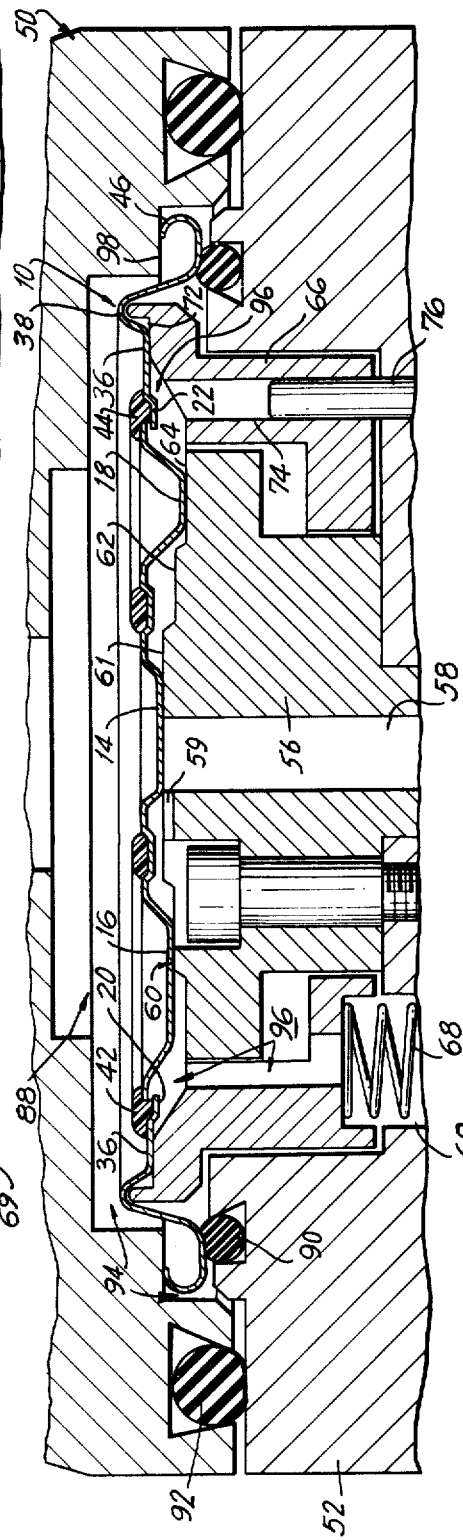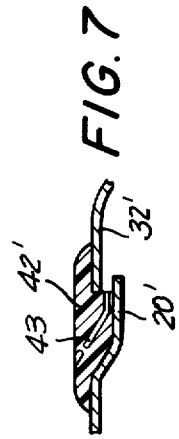

METHOD AND APPARATUS FOR TESTING END CLOSURES

BACKGROUND OF THE INVENTION

This invention relates to the art of testing container end closures for leakage.

Various apparatus and methods exist for testing materials or structures such as end closures or the like by introducing a gas into a confined area in which the end closure is placed and recording gas seepage or leakage therethrough. Notably, U.S. Pat. No. 3,499,314 issued on Mar. 10, 1970, discloses a testing apparatus wherein an end closure to be tested is placed within a cell or chamber thereby sealedly dividing the chamber into two sealed sections, high-pressure gas is supplied into one section while the other is simultaneously purged to the atmosphere to thereby flex the end, gas leakage is monitored or sensed in the other section, and leakers are identified and ejected from the testing system.

One of the main problems with such known high-pressure gas end closure testing apparatus and methods is that they are unsuitable for testing an apertured structure having a displaceable member covering the aperture and sealed to the structure by a distensible sealant material, for example a metal button down end closure having displaceable opening tabs or buttons sealed to the end closure by plastisol, hot melt or other plastic sealant materials. The sealant materials are resistant to container product internal pressures yet finger-pressure-fracturable for opening the sealed aperture.

The sealant materials sometimes do not effect perfect seals due to imperfections in the materials such as voids, pinholes, pinhole channels and impurities wedged therein, and/or due to imperfect seals of areas and pathways at the sealant metal end closure and/or button interfaces. It, therefore, is desirable to test the seals and sealant materials for leakage before the end closures are secured to filled containers and passed to consumers. But with conventional end closure testing methods and apparatus such as disclosed in the aforementioned patent, if for example a plastisol-sealed button down end closure is inverted and placed in a two-section pressure gas chamber and high-pressure gas is introduced into the upper chamber above the inverted end closure, the pressure may force the button rim downward metal-to-metal against the end closure panel aperture rim and thereby prevent testing the effectiveness of the seal provided by the plastisol material. Undesirably, false readings that ends do not leak are obtainable when in fact there may not even be any plastisol present on the end. Subjecting the other side of the end closure, i.e. its intended top surface to the high-pressure gas often results in button blow off, or excessive separation between buttons and their apertures which can tear the plastisol materials or otherwise destroy their seal to the button or end closure.

This invention overcomes the aforementioned problems by providing improved method and apparatus for testing for leakage structures such as end closures having displaceable members such as buttons sealed to the structures or end closures by sealant materials.

Briefly, the improved method involves effecting a separation between the end closure and the displaceable member to distend the sealant material a distance less than its elastic limit while one section of the test chamber is injected with a testing media, preferably a pressurized gas to expose the distended sealant to the gas pressure to test it and the seal it provides for leakage.

The improvement in the apparatus resides in providing the test chamber with means for effecting a separation between the end closures and their displaceable members or buttons. The means for effecting the separation can include a resisting surface such as a fixed solid center chuck which holds the buttons in a substantially fixed position while moving means move the rest of the end closure away from the buttons.

It is an object of this invention to provide improved method and apparatus employing a testing media for testing for leakage, container end closures having displaceable members sealed to the end closures by distensible sealant materials.

It is another object of this invention to provide the aforementioned method and apparatus wherein the testing media is a pressurized gas and the end closures tested are metal button down end closures and the displaceable members are the buttons.

It is another object of this invention to provide the aforementioned method and apparatus wherein the end closures tested are button down end closures and the buttons are sealed thereto by a plastisol sealant material.

It is yet another object of this invention to provide the aforementioned method and apparatus wherein the gas is of high pressure.

These and other objects and advantages of this invention will be apparent as it is better understood from the description which follows, which taken in conjunction with the drawing discloses preferred embodiments thereof.

BRIEF DESCRIPTION OF THE DRAWINGS

FIG. 1 is a top plan view of a button down end closure.

FIG. 2 is a bottom plan view of the end closure of FIG. 1.

FIG. 3 is an enlarged vertical cross section with portions broken away taken through upper and lower chambered members which form the test chamber of the improved apparatus of this invention.

FIG. 4 is an enlarged vertical cross section with portions broken away showing an end closure in the test chamber of FIG. 3 in a partially closed, unsealed position.

FIG. 5 is an enlarged vertical cross section with portions broken away showing the test chamber of FIG. 4 in a closed, sealed position.

FIG. 6 is an enlarged vertical cross section with portions broken away showing the distended sealant material at separation effected between the end closure button rim and panel aperture rim.

FIG. 7 is an enlarged vertical cross section with portions broken away showing a pinhole channel in the distended sealant material.

DETAILED DESCRIPTION OF THE INVENTION

Referring to the drawings in detail, FIG. 1 shows the top of a button down end closure generally designated 10 having a central panel 12 which includes raised reinforcing panel portion 14 and displaceable members, here shown as opening tabs or buttons 16, 18. Button 16 is intended as a pour button, and button 18 as a vent button. The buttons close and displacement of the buttons provides pour and vent apertures, respectively defined by central panel aperture rims 20, 22 which can each be formed of raised beads 24, 26. Buttons 16, 18 are connected to the end closure by integral hinges 28, 30 and may have raised central portions and button rims 32, 34 (dashed line) extending under and beyond aperture rims 20, 22 (FIGS. 2 and 3). Central panel 12 also includes peripheral panel portion 36 which merges into a surrounding integral reinforcing groove 38 which in turn merges into peripheral flange 40 for securing the end closure to container bodies as by conventional double seams.

FIG. 2, a bottom view of end closure 10, shows button rims 32, 34 (dashed line) under sealant material 42, 44 shown in the form of rings and which can be any distensible or elastic sealant material used for sealing end closure apertures by sealing portions preferably the rims of displaceable members such as buttons 16, 18 to at least the rims of the apertures which they cover or close. The sealant material can be any suitable plastisol, thermoplastic such as hot melt, elastomeric, plastic type tape, or adhesive foil sealant material. An example of a suitable sealant material is a plastisol grade polyvinyl chloride combined with a conventional plasticizer and compounding ingredients. This plastisol is heat curable to form a non-tacky somewhat yieldable material that retains the buttons in place and maintains a suitably hermetic seal under pressure of the magnitude normally found in beer and carbonated beverage containers. Conveniently, the sealant rings fill the area formed by raised beads 24, 26 (FIG. 1) and surround and seal the button rims to the aperture rims. Flange 40 includes a peripheral flange curl 46 which facilitates the seaming of the end closure to a container body. Button down end closure 10 is a pressure-resistant closure which can resist internal container pressures of up to about 90 psi developed at elevated temperatures of up to about 140°F. as often occuring in containers for pressurized products such as beer, carbonated beverages and the like.

FIG. 3 is an enlarged vertical cross section with portions broken away of a test chamber generally designated 48 which is part of a larger overall apparatus for testing end closures for leakage. Test chamber 48 includes vertically movable or reciprocable upper chambered member 50, fixed lower chambered member 52 affixed to support 54, and means connected to the chambered members for effecting a separation between an end closure and its displaceable member to test the end closure, the sealant material and the seal it provides for leakage. The separation effecting means can include resisting means, here shown as solid center chuck 56 fixed to the lower chambered member and having an axial gas exit channel 58, connecting gas exit channel 59, and upper resisting surface generally designated 60 which includes concentric steps 61 and 62, 64, step 61 being for reducing downward flexing of end closure central panel 12, and steps 62, 64 for resisting downward movement of the buttons or their rims when the rest of the end closure that is, the non-displaceable portion thereof and its aperture rims is moved vertically downward. The separation effecting means can also include moving means including pilot ring 66 peripheral to center chuck 56, upwardly-biased by and mounted on helical spring 68 in cutout 69, to allow it to move or reciprocate substantially vertically within lower chambered member 52. Pilot ring 66 includes peripheral upstanding flange 70, radially inwardly-adjoining circumferential panel seat 72 for seating an end closure thereon, axial gas exit channels 73 (one shown) which can communicate with cavity 75, and cutout 69, and vertical pin channel 74 having pin 76 therein which prevents the pilot ring from rotating yet allows it to reciprocate vertically on the pin fixedly held as by friction at its base by lower chambered member 52. Gas exit channel 58 communicates such as through the bore of adapter 78 screw-fastened within lower chambered member 52, with conventional sensing means (not shown) including means such as a transducer for detecting changes such as pressure increase or build up in lower chamber 80 or the chamber second section as will be explained, due to leakage of the media through horizontally disposed end closure 10 on lower chambered member 52. The sensing means are connected to conventional sorting means (not shown) including means for rejecting leaker end closures from the test chamber. Lower chamber 80 is formed by cavity 75 and cutouts 69.

Upper chambered member 50 includes a shaft 82 to which is threadly connected an air line 84 communicating with shaft bore 86 in turn communicating with an upper chamber generally designated 88. Upper chambered member 50 also includes moving means such as engaging means which can be in the form of a circumferential engaging surface 98 for engaging an end closure placed on the pilot ring and for moving the end closure and pilot ring vertically downward. The moving means thereby cooperates with the resisting means to effect a separation by moving the end closure downwarrd relative to and away from the button.

When test chamber 48 is in the open position shown in FIG. 3 and pilot ring 66 is upwardly-biased, an end closure having a displaceable member, such as button down end closure 10, is placed therein by being seated on pilot ring 66 only by means of its peripheral central panel portion 36 resting on pilot ring seat 72. Pilot ring flange 70 orients the end closure on the pilot ring by fitting into end closure reinforcing groove 38.

As upper chambered member 50 is moved vertically downward, circumferential engaging surface 98 engages end closure flange curl 46 and applies a downward force on the end closure which, through contact between peripheral central panel portion 36 and seat 72, forces pilot ring 66 downward against the bias of spring 68 until pour button 16 is resisted by center chuck upper resisting surface 62 and vent button 18 is resisted by step 64. This resistance prevents further downward movement of the buttons and holds them in a substantially fixed position or plane, relative to further downward movement of the rest of or other portions of the end closure. In FIG. 4, downward movement of engaging surface 98 has brought O-ring 90 into unsealed, non-air tight initial contact with end closure flange 40 and O-ring 92 into unsealed non-air tight initial engagement with lower chambered member 52.

The further downward movement of upper chamber 50 from the position shown in FIG. 4 to the lower position shown in FIG. 5 compresses O-rings 90, 92 and provides an air tight seal of upper chamber 88 from the environment. End closure 10 seated on O-ring 90 divides test chamber 48 into two sections. The first section designated 94, includes the volume between the upper and lower chambered members between O-rings 90 and 92, and that above inverted end closure 10. The portion of the volume of first section 94 above end closure 10 corresponds to a portion of the volume of upper chamber 88. The second section of test chamber 48, generally designated 96, includes all of the volume formed by the seal between end closure flange 40 and compressed O-ring 90, which includes that existing between end closure 10 and pilot ring 66, that of gas exit channels 73, 58 and 59, that between chuck 56 and pilot ring 66, and that of lower chamber 80 as previously defined. This downward movement of upper chambered member 50 from its position in FIG. 4 to that of FIG. 5 also moves or displaces aperture rims 20, 22 away from the buttons or their rims 32, 34 whose downward movement is resisted by chuck resisting surface steps 62 and 64. This downward movement effects a separation between the aperture and button rims and distends or stretches plastisol sealant material 42, 44 a predetermined amount which is less than the elastic limit of the sealant material employed. While the button and panel rims are separated and the sealant material is distended, a testing media preferably a gas pressure, most preferably of high pressure, fed from a supply (not shown) through line 84 and bore 86, is injected into and fills chamber first section 94. This pressure usually flexes end closure central panel 12 slightly downward and causes raised panel portion 14 to contact uppermost chuck surface 61. Conventionally, as first section 94 is gas-pressurized, the second section 96 is simultaneously brought to atmospheric pressure. Taking flexing into account, the slightest increase in gas pressure above atmospheric in the second section due to leakage through any portion end closure 10 is sensed by conventional sensing means. If there is leakage, a signal is sent by suitable means (not shown) to sorting means which rejects the leaker when upper chambered member 50 is later raised, and removes it from the chamber to allow another end closure to be fed thereto.

FIG. 6 is an enlarged view of the distended plastisol sealant material 42 at the separation between panel and button rims 20, 32.

FIG. 7 shows that when a plastisol sealant material 42' is distended by the separation effected between respective aperture and button rims 20', 32' otherwise undetectable pinhole channels 43 are often advantageously exposed to the pressurized gas and thin membrane films supposedly sealing the pinholes and are stressed and tested with suitable pressure, here comparable to those of products such as beer and carbonated beverages.

After the testing is completed, the pressurized gas in first secion 94 is drained through suitable conventional means such as ports and valves (not shown) to the atmosphere, upper chambered member 50 is raised, pilot ring 66 is spring-biased upwardly to its position shown in FIG. 3, and tested end closure 10 is removed by suitable means from the test chamber.

The separation between the end closure panel and the displaceable member, tab or button can be effected by any suitable means which will provide the separation when the testing pressurized gas is in one of the chamber sections. The amount of separation and the amount of pressure provided must be coordinated to be nondestructive of the sealant material, that is, to not excessively distend, destroy or separate the material from or destroy its seal to, the panel and/or displaceable member. Although separation and pressure must not stress the sealant material, or the button hinges or connections, beyond their elastic limits, separation preferably is sufficient to pressure-expose voids, pinhole channels and impurities, and pressure-test thin webs or membranes supposedly sealing them.

Factors which affect the extent of separation are the relative heights of the displaceable members, and the center chuck upper and step resisting surface and the extent that the O-ring in contact with the end closure is compressed when the upper chambered member is in its lowermost fully air-tight, chamber-sealing position shown in FIG. 5.

Depending on the sealant material employed, the extent of separation can be some measurable distance, for a plastisol material, preferably less than 0.010 inch, more preferably, less than about 0.007 inch, and most preferably less than about 0.005 inch. Unless there is some measurable separation between the button and panel aperture rims, the gas pressure, especially where high, forces and could keep the rims in contact and a false sensing that an end does not leak is possible even in the total absence of sealant material.

The testing media injected into the chamber first section can be any suitable media which would pass from one chamber section through defects in the sealant material and the seal it provides, and would be detectable in the other chamber section. Suitable testing media are light and sound, but the preferred is pressurized gas. The range of gas pressure employed depends on the structure and sealant material tested. For testing conventional end closure sealant materials, the pressure can be from about 5 to 90 psi. For testing end closures for beer and carbonated beverage containers the higher pressures within this range are preferred; most preferably, a high-pressure gas of about 80 psi is employed. High gas pressures tend to flex the central panel downwardly but such flexing is prevented by chuck step 61, and what flexing there is does not appear to significantly affect the extent of separation.

The height of the fixed center chuck is such that its resisting surfaces contact each displaceable member or button preferably at about the same time, approximately when the upper chambered member brings the closure flange into initial contact with the underlying O-ring. Since the center chuck is fixed and its resisting surfaces hold respective buttons substantially steady or in fixed planes or positions while the rest of the end is being moved away from these positions, the extent of separation between the button and panel aperture rims can be and preferably is controlled by the extent of compression of O-ring 90. Preferably, O-ring 90 is constructed of or treated with a material such as silicone which would tend to prevent any adherence between the closure flange and O-ring which might delay or prevent pilot ring 66 from returning a tested end closure to the end feed-discharge level or position of FIG. 3.

In the embodiment shown in the drawings, the amount of spring pressure exerted by springs 68 is kept low so that the springs have little or no effect on the extent of separation. When the upper chambered member is fully lowered, the spring force is not great enough to move end closure central panel peripheral position 36 upward and close the gap between the button and aperture rims.

It is to be noted that the apparatus of this invention includes within its scope any suitable means for effecting the separation. For example the center chuck can have a substantially planar resisting surface for resisting pour and vent buttons of equal height, and, where an end is placed upright in the test chamber, the upper chambered member can have means for displacing the buttons downward away from the rest of the end closure which can be resisted by a fixed pilot ring. The apparatus can be set up such that the testing media or pressurized gas can be injected into the chamber second section below an inverted end closure or into the first or second section when an end closure is placed upright in the test chamber.

It is thought that the invention and many of its attendant advantages will be understood from the foregoing description and it will be apparent that various changes may be made in the structure of the apparatus and in the steps of the process and their order of accomplishment without departing from the theory and scope of the invention or sacrificing all of its material advantages, the method and apparatus disclosed being merely preferred embodiments thereof.

What is claimed is:

1. In the method of testing an end closure for leakage, of the type including the steps of providing a test chamber sealedly divisible into first and second sections by an end closure placed therein, placing an end closure therein, injecting a testing medium into the first section, and sensing change in the second section due to leakage of the medium through the end closure, the improvement for testing an end closure having a displaceable member sealed to the end closure by a distensible sealant material, which comprises: effecting a separation between the end closure and displaceable member to distend the sealant material while the one section is gas pressurized and to expose the sealant material to the pressurized gas to test the sealant material and the seal it provides for leakage.

2. The improved method of claim 1 wherein the separation effecting step is effected by holding the displaceable member in a substantially fixed position and moving the end closure away from it.

3. The improved method of claim 2 wherein the holding step is effected by providing a resisting surface under the displaceable member.

4. In the method of testing an end closure for leakage, of the type including the steps for providing a test chamber sealedly divisible into first and second sections by an end closure placed therein, placing an end closure therein, injecting gas pressure into the first section, and sensing pressure buildup in the second section due to leakage through the end closure, the improvement for testing an end closure having an aperture therein and having a displaceable member closing the aperture and sealed to the end closure by a distensible sealant material, which comprises: effecting a separation between the end closure and displaceable member to distend the sealant material while the one section is gas pressurized and to expose the sealant material to the pressurized gas to test the sealant material and the seal it provides for leakage.

5. In the method of testing an end closure for leakage, of the type including the steps of providing a test chamber sealedly divisible into first and second sections by an end closure place therein, placing an end closure therein, injecting high-pressure gas into the first section, and sensing pressure buildup in the second section due to leakage through the end closure, the improvement for testing a button down end closure having a displaceable button and a distensible sealant material sealing the button to the end closure, which comprises: effecting a separation between the end closure and the button to distend the sealant material while the one section is highly pressurized and to expose the sealant material to the high-pressure gas to test the sealing material and the seal it provides for leakage.

6. The improved method of claim 5 wherein the separation effecting step is effected by holding the button in a substantially fixed position and moving the end closure away from it.

7. The method of claim 6 wherein the separation effected is less than about 0.005 inch.

8. The improved method of claim 7 wherein the holding step is effected by providing a resisting surface under the button.

9. In an apparatus for testing an end closure for leakage of the type which includes a test chamber sealedly divisible into first and second sections by an end closure placed therein, means for injecting pressurized gas into the first section, and sensing means for detecting a pressure change in the second section due to leakage through the end closure, the improvement in the test chamber for testing an end closure having a displaceable member sealed thereto by a distensible sealant material, which comprises: means connected to the test chamber for effecting a separation between the end closure and its displaceable member to distend the sealant material while the test chamber is gas pressurized and to expose the sealant material to the pressurized gas to test the sealant material and the seal it provides for leakage.

10. The improved apparatus of claim 9 wherein the means for effecting the separation include resisting means for holding the displaceable member in a substantially fixed position relative to the end closure and moving means for moving the end closure away from the displaceable member.

11. The improved apparatus of claim 9 wherein the sealant material is distended less than about 0.005 inch.

12. The improved apparatus of claim 10 wherein the sealant material is distended less than about 0.005 inch.

13. In an apparatus for testing an end closure for leakage, of the type which includes a test chamber sealedly divisible into first and second sections by an end closure placed therein, means for injecting high-pressure gas into the first section, and sensing means for detecting a pressure increase in the second section due to leakage through the end closure, the improvement in the test chamber rendering it utilizable for testing a button down end closure having a displaceable button sealed to the end closure by a distensible sealant material, which comprises: means connected to the test chamber for effecting a separation between the end closure and its button to distend the sealant material while the test chamber is highly-pressurized to expose the sealant material to the high-pressure gas to test the sealant material and the seal it provides for leakage.

14. The improved apparatus of claim 13 wherein the end closure to be tested has an aperture rim defining an aperture therein, the button closes the aperture, the sealant material is a plastisol which surrounds and seals the button rim and the aperture rim, and the separation effecting means includes resisting means for holding the button rim in one position relative to the aperture rim and moving means for moving the aperture rim away from the button rim.

15. The apparatus of claim 14 wherein the separation effected is less than 0.005 inch.

16. The apparatus of claim 14 wherein the test chamber is formed by a moveable upper chambered member and a fixed lower chambered member, the improvement further comprising the resisting means including a center chuck fixed to and within the lower chambered member, said center chuck having an upper resisting surface for resisting downward movement of the button when the rest of the end closure is moved downward, and the moving means including an upwardly-biased pilot ring peripheral to the center chuck and spring-mounted within the lower chambered member, said pilot ring having a seat for seating a peripheral portion of said end closure thereon, and engaging means on said upper chambered member for engaging an end closure placed on the pilot ring and for moving the end closure and pilot ring downward, the resisting means and moving means cooperating to effect the separation by moving the end closure downward relative to and away from the button.

* * * * *